(12) United States Patent
Negrón Crespo

(10) Patent No.: US 7,339,285 B2
(45) Date of Patent: Mar. 4, 2008

(54) HYDROELECTRIC WAVE-ENERGY CONVERSION SYSTEM

(76) Inventor: Jorge Negrón Crespo, 809, Managua, Urb. Las Américas, RP, San Juan, PR, PR (US) 00921

( * ) Notice: Subject to any disclaimer, the term of this patent is extended or adjusted under 35 U.S.C. 154(b) by 0 days.

(21) Appl. No.: 11/622,031

(22) Filed: Jan. 11, 2007

(65) Prior Publication Data

US 2007/0158950 A1 Jul. 12, 2007

Related U.S. Application Data

(60) Provisional application No. 60/766,347, filed on Jan. 12, 2006.

(51) Int. Cl.
*F03B 13/10* (2006.01)
*F03B 13/12* (2006.01)
*H02P 9/04* (2006.01)

(52) U.S. Cl. .......................... 290/53; 290/42

(58) Field of Classification Search ................. 290/42, 290/54, 53, 43; 60/501, 498, 398; 405/76; 416/7; 415/7

See application file for complete search history.

(56) References Cited

U.S. PATENT DOCUMENTS

| | | | | |
|---|---|---|---|---|
| 2,135,337 A | * | 11/1938 | Herbest, Jr. ................. | 405/32 |
| 3,307,827 A | * | 3/1967 | Silvers et al. ................. | 60/501 |
| 3,988,592 A | * | 10/1976 | Porter ......................... | 290/53 |
| 4,398,095 A | * | 8/1983 | Ono ............................. | 290/53 |
| 4,739,182 A | * | 4/1988 | Kenderi ....................... | 290/54 |
| 4,883,411 A | * | 11/1989 | Windle ....................... | 417/331 |
| 6,020,653 A | * | 2/2000 | Woodbridge et al. ......... | 290/53 |
| 6,229,225 B1 | * | 5/2001 | Carroll ........................ | 290/53 |
| 6,291,904 B1 | * | 9/2001 | Carroll ........................ | 290/53 |
| 6,392,314 B1 | * | 5/2002 | Dick ........................... | 290/53 |
| 6,700,217 B1 | * | 3/2004 | North et al. .................. | 290/53 |
| 6,756,695 B2 | * | 6/2004 | Hibbs et al. .................. | 290/42 |
| 6,768,216 B1 | * | 7/2004 | Carroll et al. ............... | 290/42 |
| 7,042,112 B2 | * | 5/2006 | Wood .......................... | 290/53 |
| 7,141,888 B2 | * | 11/2006 | Sabol et al. .................. | 290/53 |
| 7,164,212 B2 | * | 1/2007 | Leijon et al. ................. | 290/42 |
| 2003/0116971 A1 | * | 6/2003 | Likitcheva ................... | 290/53 |
| 2004/0007880 A1 | * | 1/2004 | French ......................... | 290/53 |

\* cited by examiner

*Primary Examiner*—Julio C. Gonzalez
(74) *Attorney, Agent, or Firm*—Roberto J. Rios; Hoglund & Pamias PSC

(57) ABSTRACT

A method and system to capture kinetic energy of the sea waves and convert it to electrical power is presented. The hydrodynamic power of the waves is converted to mechanical power after impacting and moving a special panel. The mechanical power is converted into a controlled-cycle hydraulic power to activate a hydraulic motor, which in turn activates an electrical generator. Electrical power is then measured, controlled and distributed to a power grid or end users.

19 Claims, 10 Drawing Sheets

HYDROELECTRIC WAVE-ENERGY CONVERSION SYSTEM

FIELD OF THE INVENTION

The present invention is related to the generation of power and more particularly, to the generation of hydroelectric power by the use of tidal and/or wave action.

BACKGROUND OF THE INVENTION

Energy is produced from a variety of sources such as fossil fuels, nuclear energy, solar energy, and water movement. Now a day, fossil fuels and carbon represent the base of energy resources in terms of dependency. However, depletion and pollution are the biggest financial and environmental concerns for society.

The use of tidal and/or wave movement from the sea provides an energy source that is abundant and does not produce waste products that present pollution problems. Wave energy is a viable option since it comes from the wind, the sun, the tides and it's more concentrated that solar energy alone and wind forces combined. Some prior art devices compress air and use it as a driving force. Some pump water directly through waterwheels. Some others store water in an elevated reservoir to be used as a hydraulic head for water turbine. Still others attempt a direct mechanical coupling to the ultimate load to be driven.

Existing wave power devices are categorized by the method used to capture the energy of the waves, by the intended location, and by the power take-off. Method types are wave power point absorber, occupying a small area; wave power attenuator, occupying a line parallel to wave propagation; and wave power terminator, occupying a line perpendicular to wave propagation. Locations are shoreline, offshore, and deep water. Types of power take-off include these: hydraulic ram, elastomeric hose pump, pump-to-shore, hydroelectric turbine, air turbine, and linear electrical generator. Systems include oscillating water column, articulated pontoon, wave pump, anchored buoy, fixed buoy, and overtopping reservoir. Several of these designs incorporate parabolic reflectors as a means of increasing the wave energy at the point of capture. Some wave power systems examples are: a pontoon lying in the water is driven by wave action to push or pull a generator; wave action compresses air in a tunnel which drives the vanes of a generator; a device called CETO, currently being tested off Fremantle, Western Australia, has a seafloor pressure transducer coupled to a high-pressure hydraulic pump, which pumps water to shore for driving hydraulic generators or running reverse osmosis desalination; and waves overtop the side of a reservoir, and the water in the reservoir runs hydroelectric generators.

Thus, a need still exists for a practical and economical system that accommodates for variations in the wave energy source and provides an efficient energy conversion means to supply at least part of a regional area power demand.

SUMMARY OF THE INVENTION

The present invention solves the abovementioned problems by providing an apparatus and method for generation of energy from waves in a simple and straightforward way. In comparison with the prior art, the present invention provides a less expensive system, increased reliability since waves are present day and night, less pollution and contamination, reduction of external energy sources like fuel oil. The present invention is could also be combined with solar, thermal and/or wind power where warranted by weather conditions. In addition, with some modifications the inventive apparatus and system could also be implemented in commercial ships.

The present invention captures the kinetic energy of the sea waves and converts it to electrical power. This electricity may be used to provide or supplement at least part of the existing power grid. Thus, the sea surface waves may prove to be a continuous, renewable, inexpensive and nonpolluting alternate energy source.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

This specification and the accompanying drawings disclose several preferred embodiments as examples of the invention. The invention is not intended to be limited to the embodiments illustrated. Numerous modifications, changes, variations, substitutions and equivalents will be apparent to those skilled in the art without departing from the spirit and scope of the present invention as described in the claims.

Figure 1:
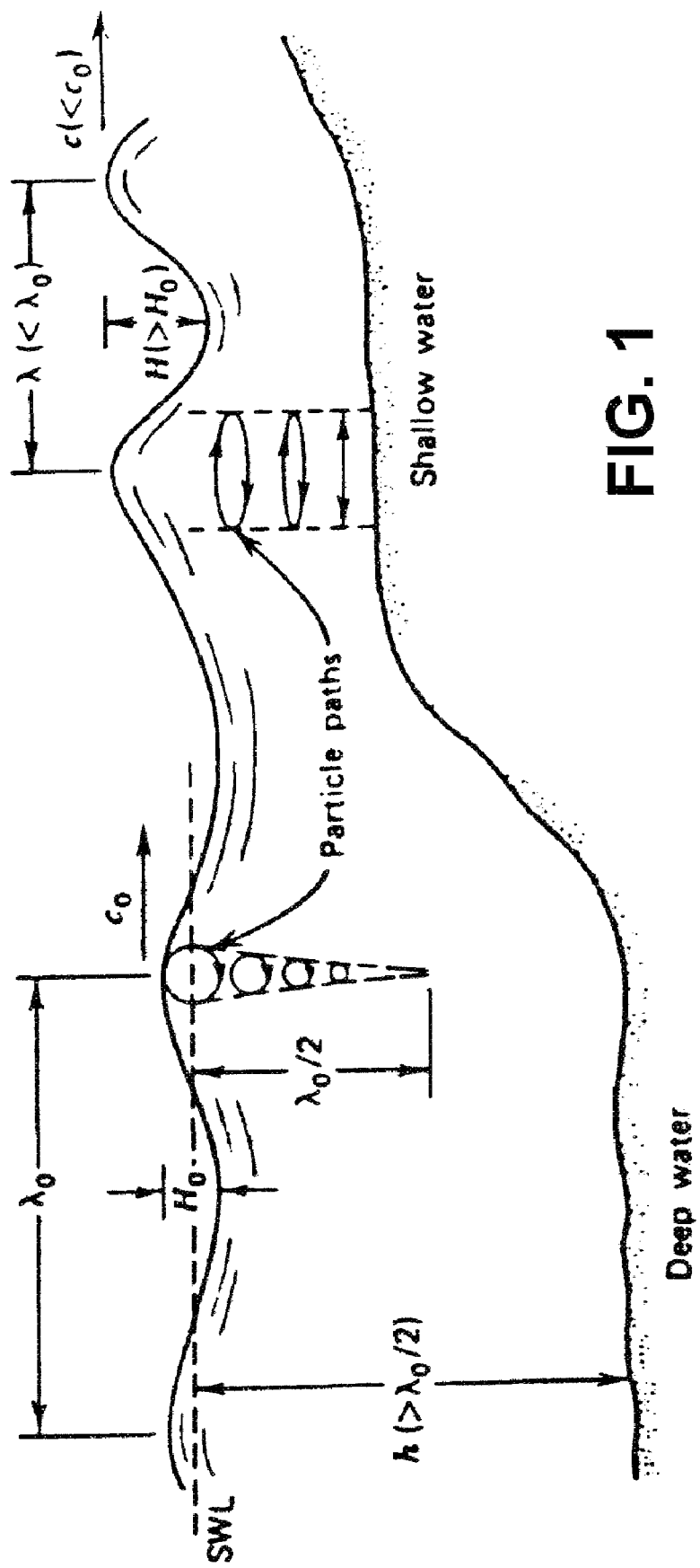
FIG. 1 shows a comparative diagram of a wave's behavior.
Figure 2:
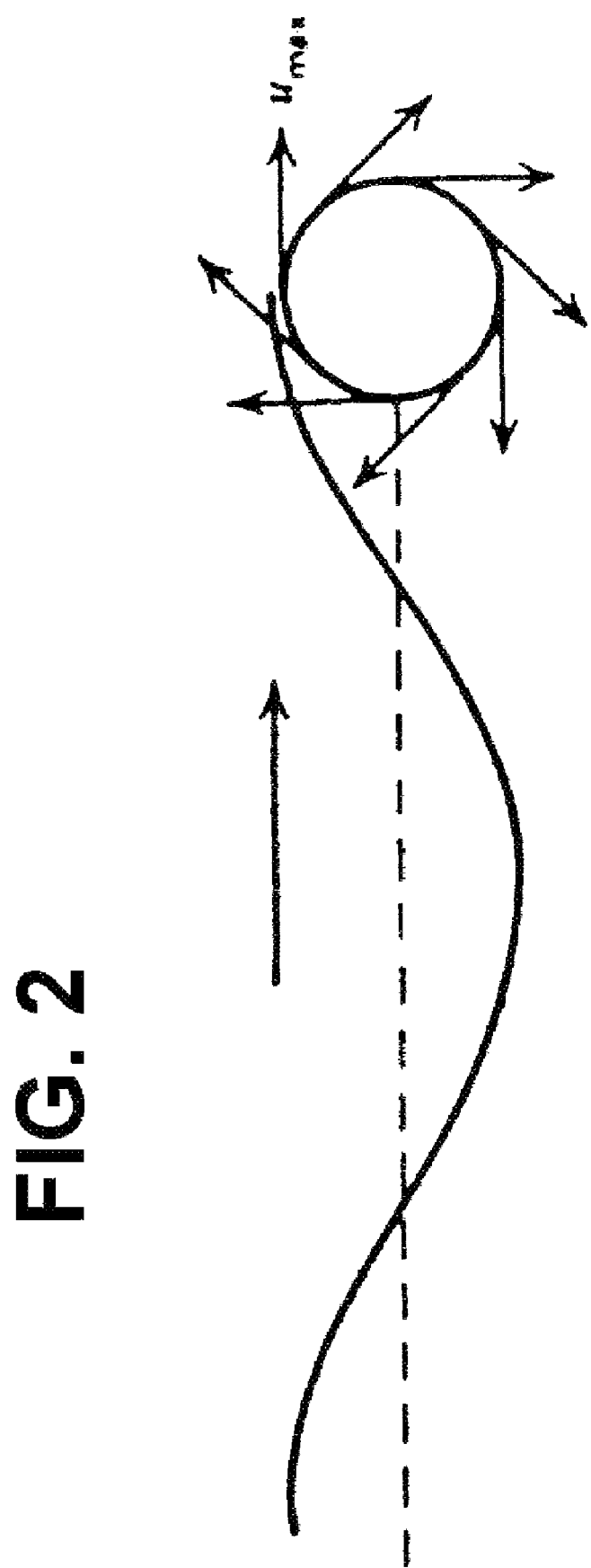
FIG. 2 shows a diagram of water particles behavior in a wave.

In order to understand the wave energy apparatus and system of the present invention, we need to explain how waves are created in view of FIGS. 1 and 2. Wind is caused by differences in temperature due to the solar heating of the earth's atmosphere. When this wind skims over the sea, an interaction is caused in which energy is exchanged between the wind and the sea surface. At first, little ripples arise on the surface. Then, the wind that skims along these ripples causes higher air pressure at the front of the wave than at the back. As a result the ripples change into small waves. As this process continues, the waves become higher and the distance between the tops (wave length) becomes longer. The amount of converted energy depends on the wind speed, the time the wind blows over the waves, and the distance it covers. During a wave's voyage, it shapes into a more regular wave, commonly referred to as a swell. At ocean shores, swells are very regular and discernable, even when the sea is calm.

Wave energy, then, can be seen as a concentrated form of solar energy. During this process of conversion, the energy is concentrated more and more, up to a power level of over 100 kW per meter of wave front. Waves are caused by a number of forces, i.e. wind, gravitational pull from the sun and moon, changes in atmospheric pressure, earthquakes etc. Waves created by wind are the most common waves. As the wind blows across the water surface air molecules from the wind interact with the water molecules they touch. This force between the air and water stretches the water's surface, resulting in small ripples, known as capillary waves. Capillary waves create more water surface increasing the friction between water and wind. This adds more energy, which increases the size of the waves, making them larger and larger. When the winds slow down or stop, the waves continue their journey, gradually but very slowly losing their energy. Waves may travel thousands of kilometers before rolling ashore. This predictability of waves is one of the advantages of wave energy as a renewable energy source.

An ocean wave in deep water appears to be a massive moving object (a crest of water traveling across the sea surface). But to understand wave energy it is important to realize that this is not the case. An ocean wave is the movement of energy, but the water is not moving like that. Out in the ocean where waves move the water's surface up and down, the water is not moving towards the shore. So, an ocean wave does not represent a flow of water. Instead it represents a flow of motion or energy from its origin to its eventual break up. This break up may occur in the middle of the ocean or against the coast. The water molecules in an ocean wave move in circles. The behavior of waves depends largely on the relationship between a wave's size and the depth of water through which it is moving. The movement of water molecule changes from circular to ellipsoidal as a wave approaches the coast and water depths decrease. Eventually when the wave rolls up on a beach (and when most of us observe waves) the movement is mostly horizontal.

In general, large waves are more powerful. Specifically, wave power is determined by wave height, speed, wavelength, and water density. Wave size is determined by wind speed and fetch (the distance over which the wind excites the waves) and by the depth and topography of the seafloor (which can focus or disperse the energy of the waves). A given wind speed has a matching practical limit over which time or distance will not produce larger waves. This limit is called a "fully developed sea". Wave motion is highest at the surface and diminishes exponentially with depth; however, wave energy is also present as pressure waves in deeper water. The potential energy of a set of waves is proportional to wave height squared times wave period (the time between wave crests). Longer period waves have relatively longer wavelengths and move faster. The potential energy is equal to the kinetic energy (that can be expended). Wave power is expressed in kilowatts per meter (at a location such as a shoreline).

The formulas below show how wave power can be calculated. Excluding waves created by unusual environmental and/or climate conditions such as: major storms, the largest waves are about 15 meters high and have a period of about 15 seconds. According to the formula, such waves carry about 1700 kilowatts of potential energy across each meter of wavefront. A good wave power location will have an average flux much less than this: perhaps about 50 kw/m. Energy (kw/m)=$kH^2T$~$0.5H^2T$, where k=constant, H=wave height (crest to trough) in meters, and T=wave period (crest to crest) in seconds. Linear wave theory assumes that the motion of the water past a point is sinusoidal. The period (T) for one wave to pass this point can be expressed by: T=$\sqrt{(2\lambda\Pi/g)}$, where $\lambda$=wavelength (m) and g=gravity=9.81 m/s2. The power contained in the wave can be expressed in terms of the length of the wave (kW/m). This is given by the following equation: P=$(\rho g^2 a^2 T)/8\Pi$, where a=wave amplitude (m).

Figure 3:
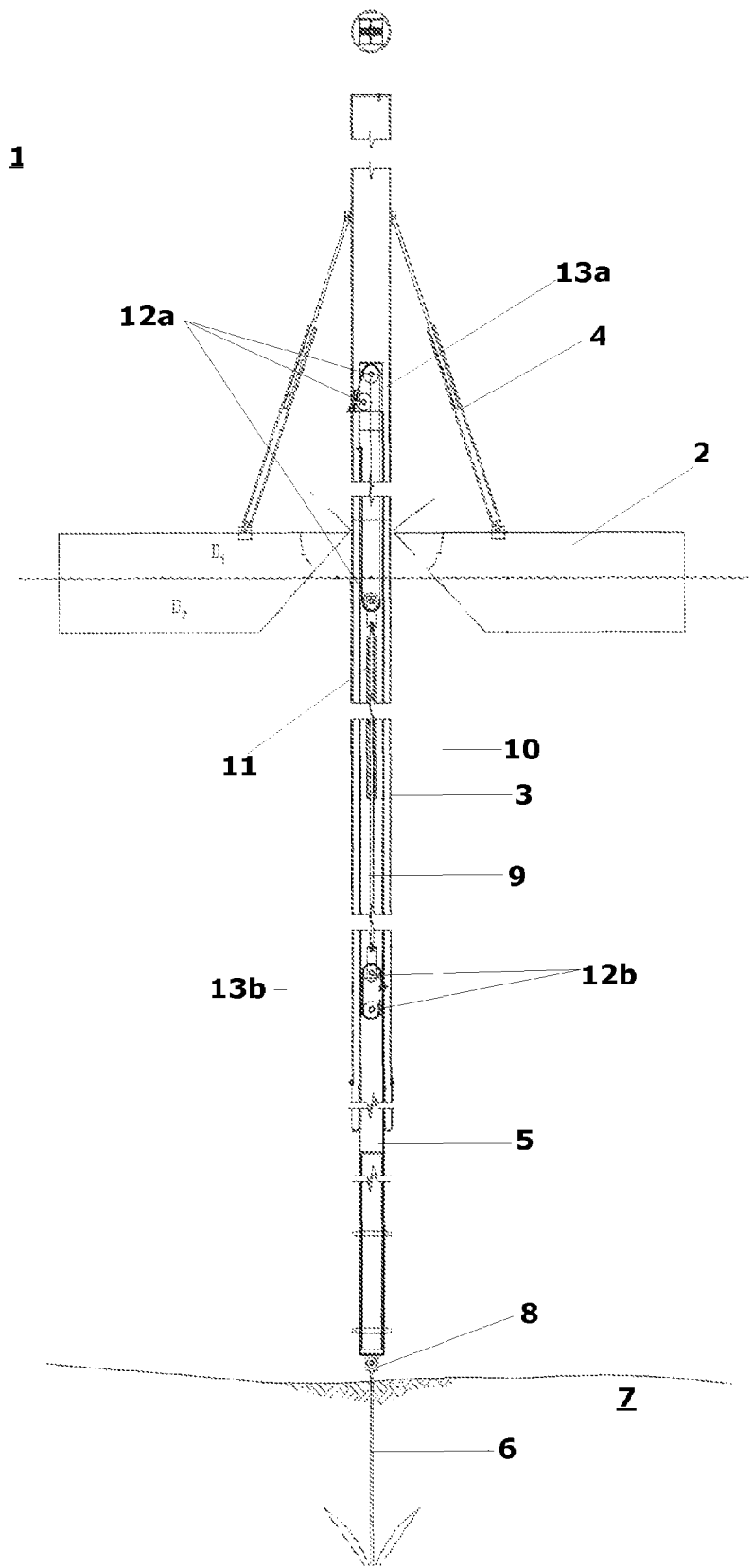
FIG. 3 shows a cross-sectional view of a wave energy conversion apparatus according to an embodiment of the invention.

FIG. 3 shows a wave energy conversion apparatus 1 according to the preferred embodiment of the invention. The hydrodynamic power of the waves is converted to mechanical power after impacting (transfer of linear momentum) and moving a plate or panel 2, which in turn is converted into controlled-cycle hydraulic power. The energized fluid activates a hydraulic motor, which moves an electric generator and electric power is then measured, controlled and distributed to the end users. The incoming/outgoing sea wave carried by statically significant sustained prevailing winds, will impact a structured panel 2 installed vertically and protruding through the sea surface. The panel may have an automatic hydraulic steering mechanism 4 to discriminate directional prevalence of waves. The horizontal rectangular panel has two legs at the extremes fixed at the bottom with revolute joints, allowing for the flow of water, sand, and sea creatures through the open space. Both sides of the plates are particularly shaped such that waves coming from different directions impact at normal angles for maximum mechanical transfer, the particular shape of inverted rectangular pyramids also provide extra rigidity. The oscillating motion of this plate in turn will activate a double-acting reciprocating mechanism 11. This mechanism will pressurize non-toxic oil located at position 16 inside cylinder 10 which will continuously flow in a close loop driving a standard hydraulic motor. The use of non-toxic oil reduces sea contamination and eliminates adverse effects on marine life. Alternatively, the non-toxic oil could pressurize a second hydraulic circuit. An electrical generator will be driven by this motor. A control system is provided to monitor and control the power requirements of the system and distribute the generated power to the external power grid. Normally, the fluid power is "piped" to shore to a pressurized stabilizing container tank and then used to drive the fluid power to the electric generator. This, in turn, facilitates the storage of the generated potential energy in said tank for future use. This permits the buoy to be automatically lowered to a normally pressurized level below the sea surface to protect it from abnormal varying wave pressures caused by environmental and/or climate conditions (i.e., hurricane, storms, etc). Thus, all these unexpected and/or undesired phenomenums have been taken into consideration in the inventive design. There is no need to include additional systems to prevent such conditions which would potentially increase the cost and complexity of the system. The buoys are constructed with a light gage metal casing containing a reinforcing means and buoyant material filing the remainder available interior space increasing shock resistance. All moving parts within the pipes are immerse within water and/or oil to prevent corrosion. The incoming fluid pipe also provides this "filling". At least some of the components and materials are corrosion resistant.

The several parts of the preferred embodiment will be explained in view of FIGS. 3, 3a, and 3b. A wave energy conversion apparatus 1 comprises at least of 3 major components: a buoyant section, a motion conversion section, and an anchoring section. The buoyant section comprises of buoys 2 connected to a portion of an outer pipe 3 of said motion conversion section through a hinged element and to another portion of said outer pipe 3 through a force damping means 4. Both sides of the buoys 2 are particularly shaped such that waves coming from different directions impact at normal angles for maximum mechanical transfer, which translates in increased hydraulic and electric energy.

Figure 4:
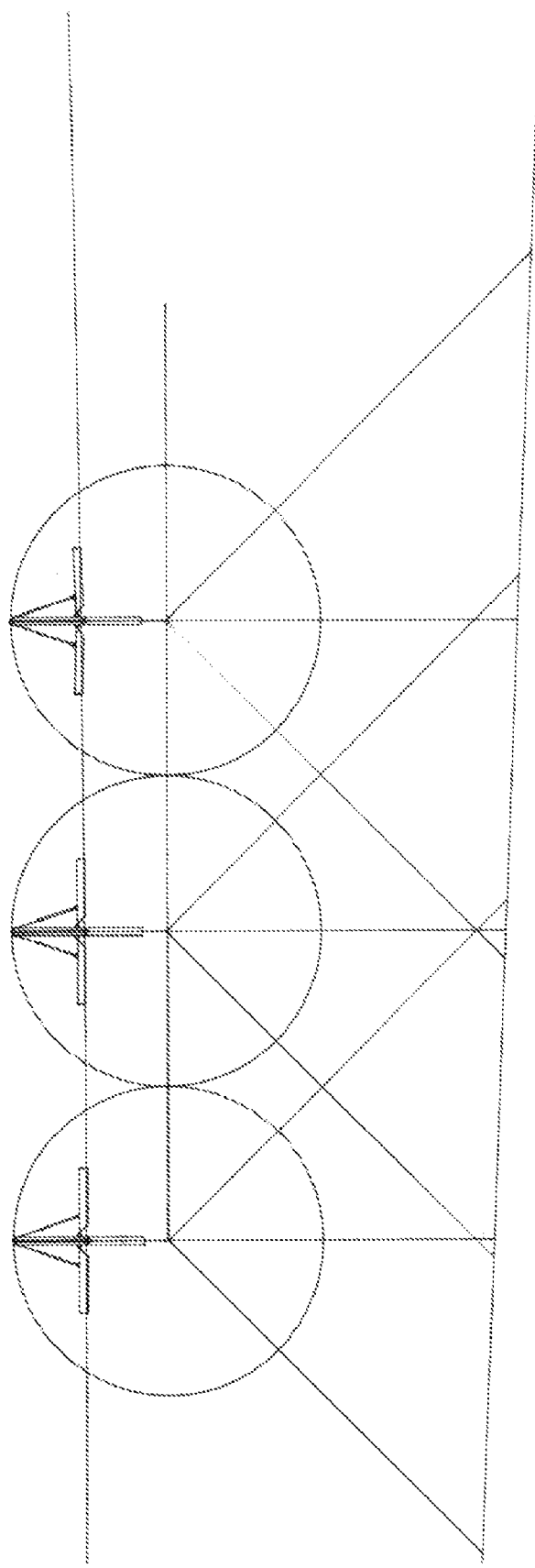
FIG. 4 shows a sectional view of a wave energy conversion system during normal wave conditions according to an embodiment of the invention.
Figure 5:
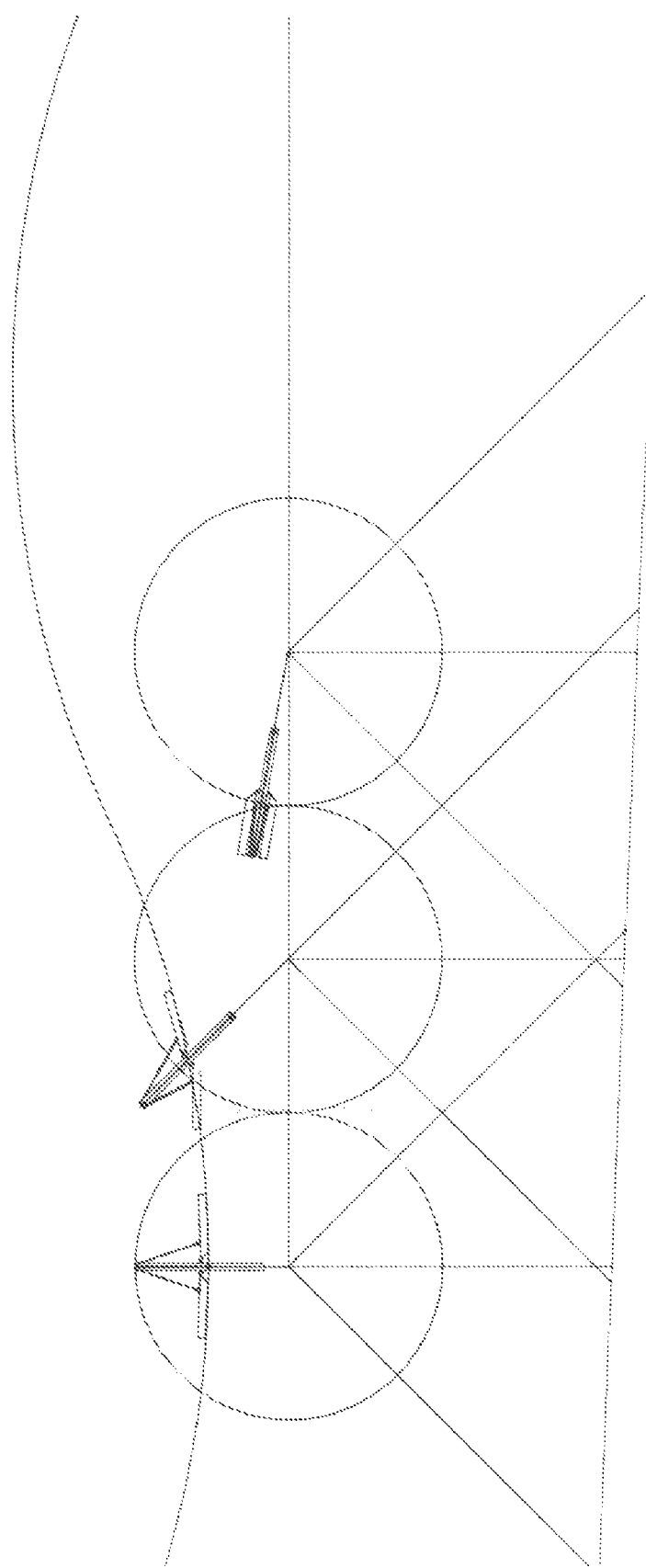
FIG. 5 shows a sectional view of a wave energy conversion system during abnormal wave conditions according to an embodiment of the invention.

The provision of both a hinged element and a force damping means 4 such as: a hydraulic steering mechanism allows the buoys to fold against said outer pipe 3 when the sea level rises above a predetermined level to protect the integrity and operation of the system. Moreover, the anchoring section maintains the entire system anchored to the sea floor, so that in case of an abnormal wave pattern due to an environmental and/or climate conditions (i.e., hurricane, storms), the entire system including the folded buoys remain submerged below the sea waves as shown in FIG. 5. Once the abnormal wave pattern ceases and the wave height normalizes to at least an average height, the entire structure resurfaces as shown in FIG. 4. Three wave energy conversion apparatus are conveniently positioned at a separate distance over the sea surface. As can be seen, during normal wave conditions the energy conversion mechanisms interact to convert the kinetic energy of waves into electrical energy. However, as seen on FIG. 5 during abnormal wave conditions such as: hurricanes, the waves height vary and increase so that some of the wave energy conversion apparatus are submerged, while others are still above the sea surface. This is a special mechanical design that avoids breaking the apparatus due to extreme wave conditions.

Figure 3A:
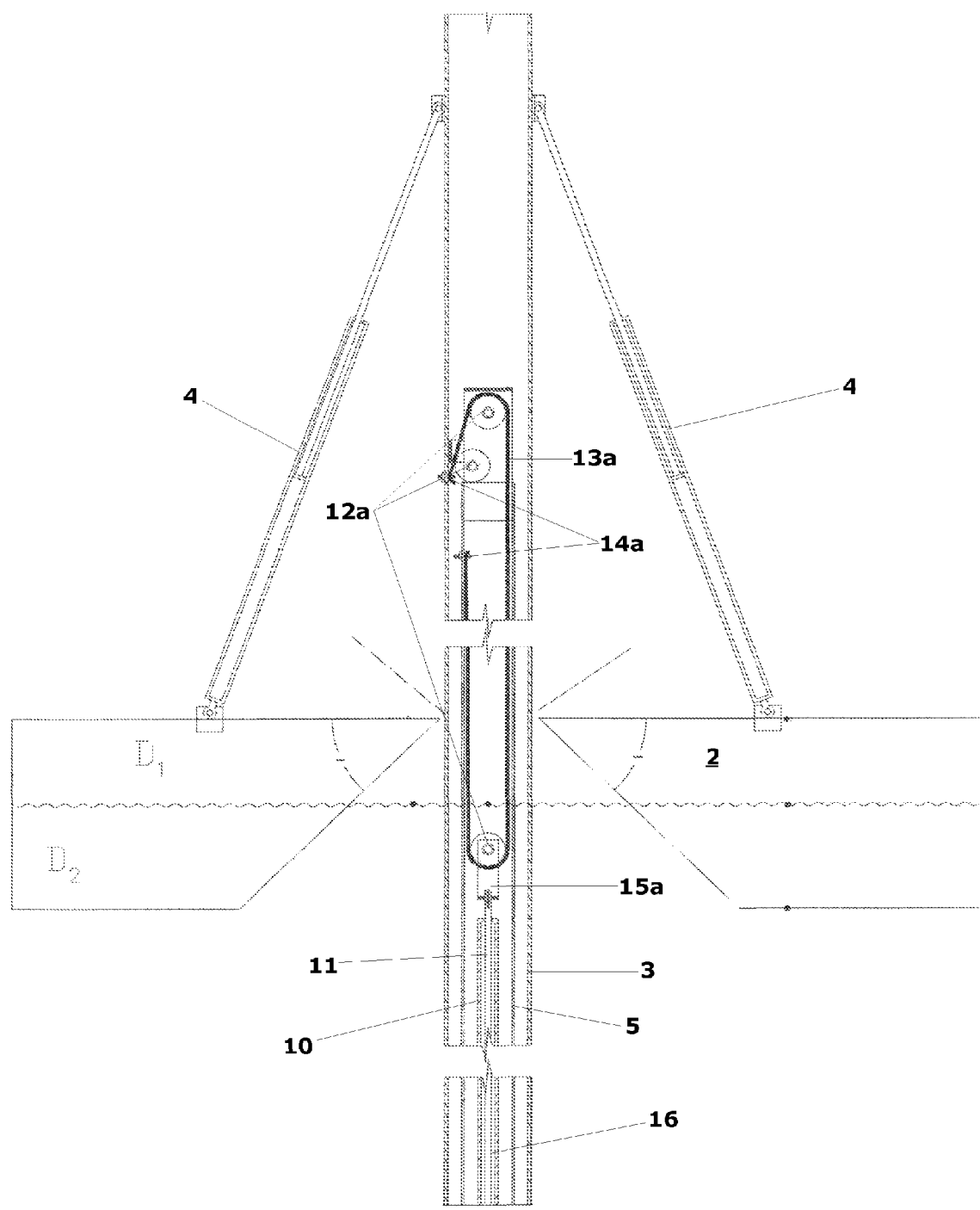
FIG. 3a shows a cross-sectional view of an upper portion of a wave energy conversion apparatus according to an embodiment of the invention.
Figure 3B:
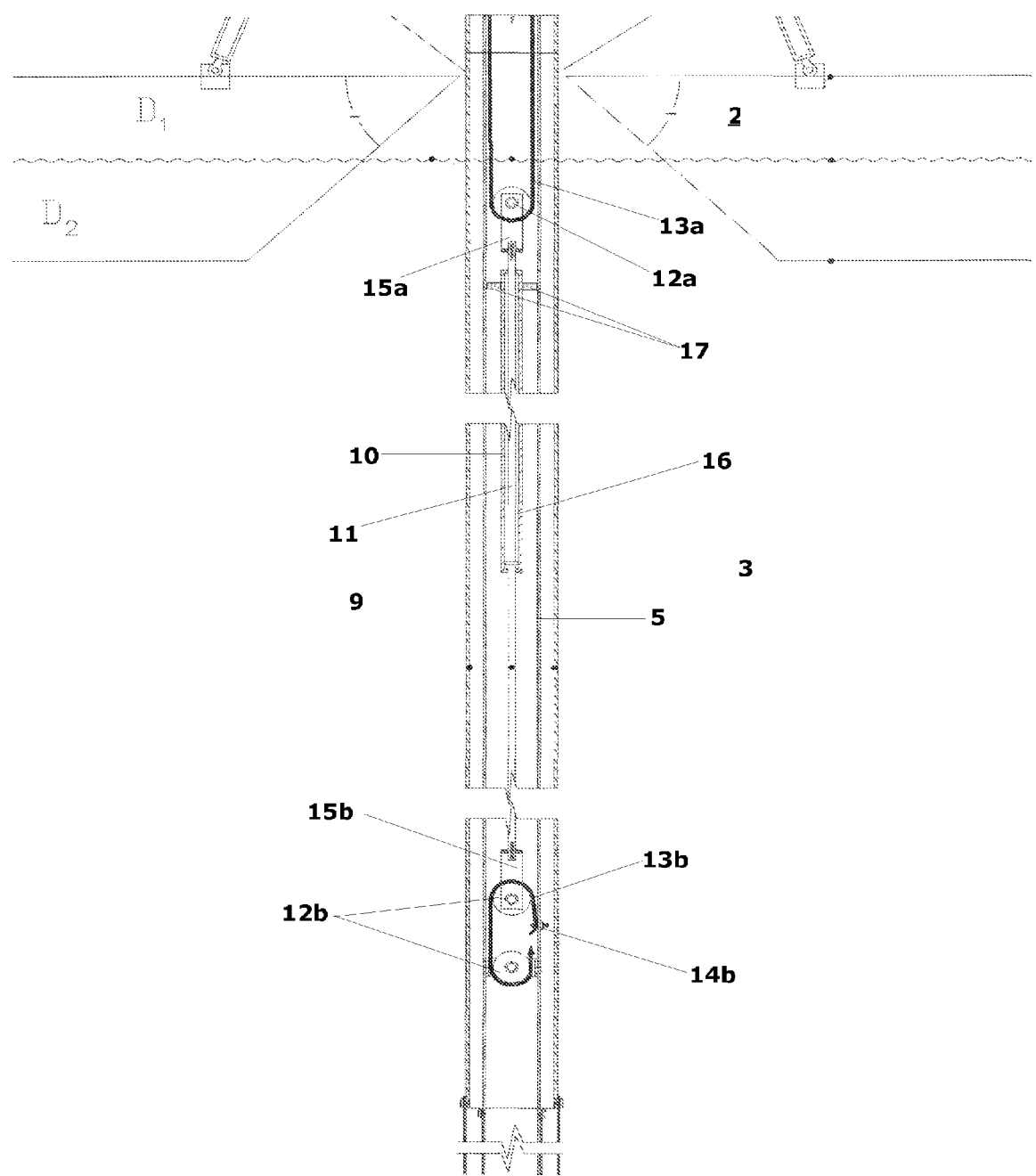
FIG. 3b shows another cross-sectional view of a wave energy conversion apparatus according to an embodiment of the invention.
Figure 8:
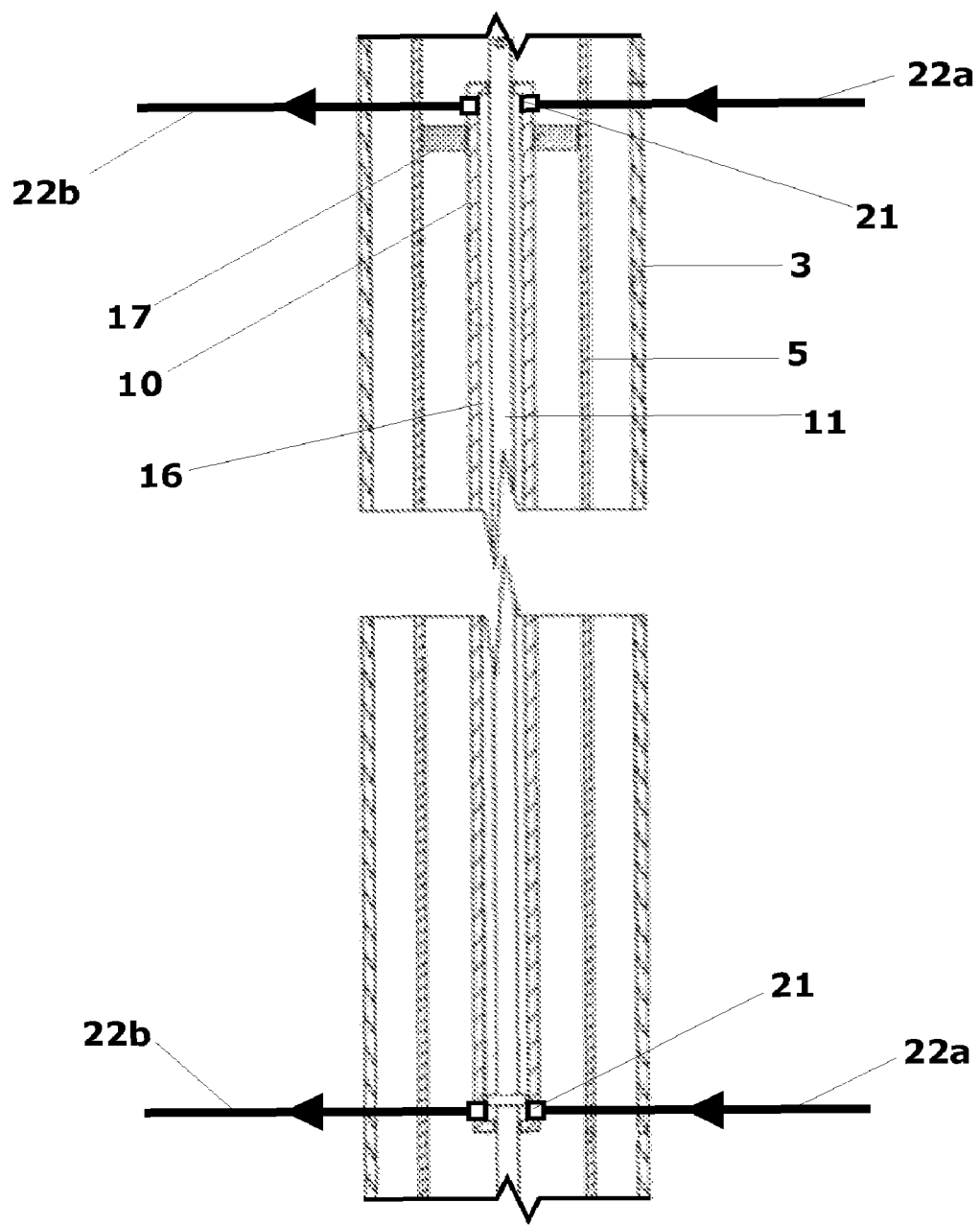
FIG. 8 shows a cross-sectional view of a piston/cylinder arrangement of a wave energy conversion apparatus according to an embodiment of the invention.

FIGS. 3a, 3b and 8, more clearly illustrates the operation of the motion conversion section. A second pipe 5 is positioned inside said outer pipe 3 in a longitudinally slidable relationship. The second pipe 5 has a cross-sectional area smaller than said outer pipe 3. Preferably, the second pipe 5 has a square shaped area. However, other shapes are also envisioned as being part of the invention as long as the second pipe 5 retains it longitudinally slidable characteristic in relation to said outer pipe 3. A piston/cylinder arrangement is fixedly positioned inside said second pipe 3 as shown in FIG. 3b. Cylinder 10 is attached to said second pipe through fixing means 17 to maintain said cylinder in a static position in relation to said buoyant section. A double-acting piston 11 is provided inside said cylinder 10 to admit alternately to each side of the piston 11 while the other side is discharging. This operation requires inlet ports 22a and outlet ports 22b located at both ends of the cylinder 10 with the flow of fluid 16 being controlled by means of unidirectional check valves 21 as shown in FIG. 8. External upper and lower portions 9 of said piston 11 are attached to joining components 15a and 15b, respectively, which in turn are attached to upper pulley 12a and lower pulley 12b, respectively. Upper pulling means 13a is mechanically connected to an upper pulley 12a and lower pulling means 13b is mechanically connected to a lower pulley 12b. In the preferred embodiment said pulling means comprises at least one of: a steel chain, and a steel cable. However, other pulling means are also envisioned as long as it maintains an efficient mechanical relationship with pulleys 12a and 12b. Fixing means 14a and 14b are provided to fix respective ends of said pulling means to at least one of: an internal wall of said outer pipe 3 and an internal wall of second pipe 5 as shown in FIGS. 3a and 3b.

Figure 7:
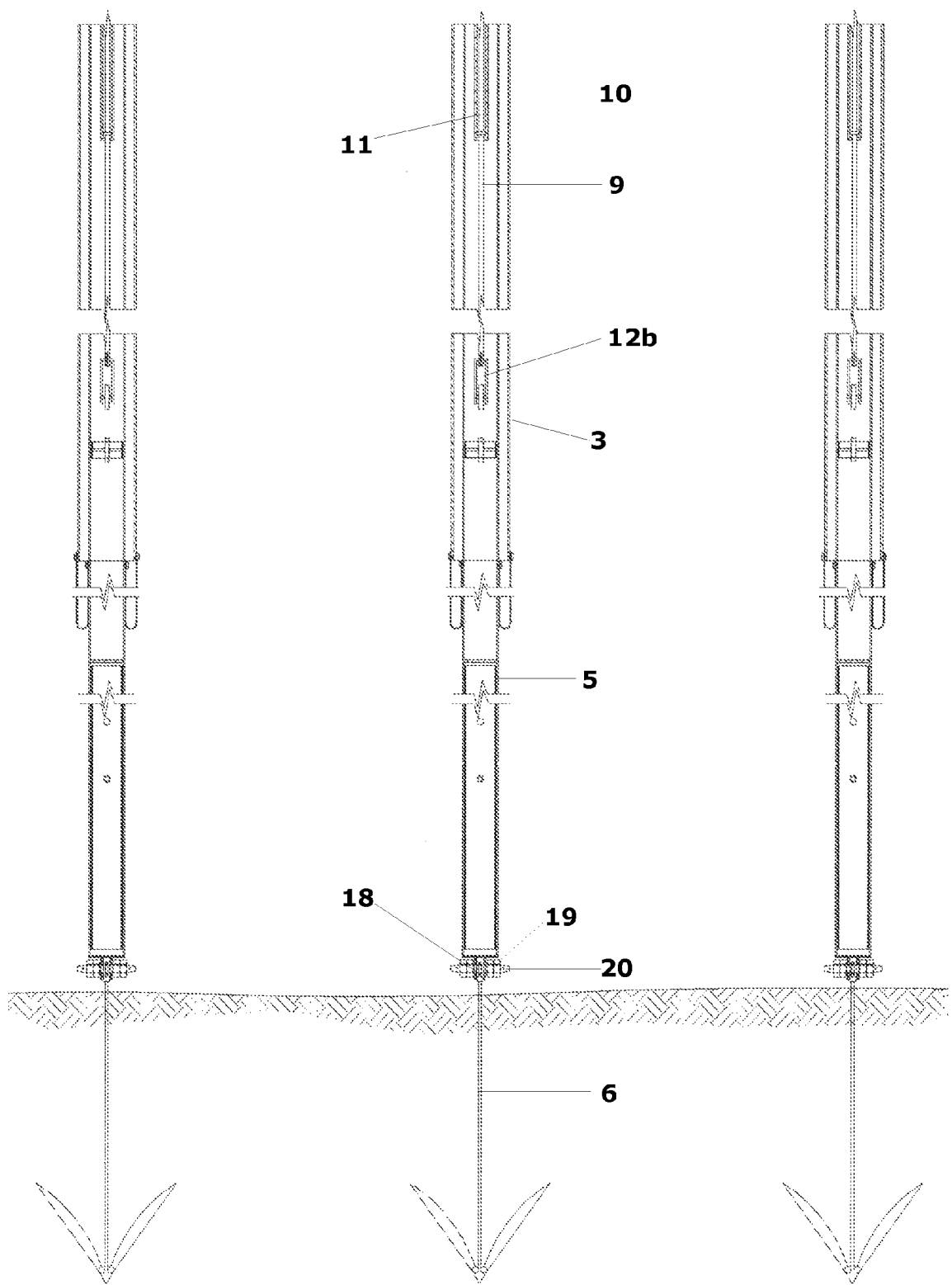
FIG. 7 shows a cross-sectional view of lower portion of a wave energy conversion apparatus according to an embodiment of the invention.

FIGS. 3 and 7 show an anchoring section in accordance with a preferred embodiment of the invention. The second pipe 5 is fixed to the sea floor 7 by means of a deeply buried anchor means 6. A rotating joining component 8 is provided to allow angular movement of said wave energy conversion apparatus 1 in relation to the sea floor 7. In the preferred embodiment, joining component 8 comprises: an anchor joining portion 18, a second pipe joining portion 19, and an axially inserted portion 20 that maintains both joining portions 18 and 19 rotationally joined together.

In operation, buoys 2 are raised and lowered in relation to the sea floor 7 based on the waves pattern. When said buoys 2 are raised, outer pipe 3 is also raised, thus, sliding away from said second pipe 5 which is stationary in relation to the sea floor 7. Since one end of pulling means 13a is fixed to an inner wall of said outer pipe 3 and the other end is fixed to an inner wall of said second stationary pipe 5, piston 11 is also raised by virtue of the upper pulleys 12a and the joining component 15a as seen on FIG. 3a. The fluid contained inside said cylinder prior to said piston being raised, is now discharged across the upper outlet port 22b through discharging valve 21. At the same time the fluid is being discharged from an upper portion of said cylinder, more fluid is being pumped inside said lower portion of the cylinder by the piston across a lower inlet port 22a. Once the buoys 2 reach a maximum height and the wave begins to go down, said piston is now pulled by pulling means 13b in mechanical relationship with joining component 15b and lower pulleys 12b. Now, the fluid 16 that was previously pump into said lower portion of the cylinder 10 is being pump away from said cylinder across a lower outlet port 22b. At the same time the fluid is being discharged from a lower portion of said cylinder, more fluid is being pumped inside said upper portion of the cylinder by the piston across an upper inlet port 22a. Thus, a continuous fluid pumping cycle that take advantage of the upward and downward movements of the waves has been established. The inlet ports 22a receive the fluid from a supply line coming from the shore and the outlet ports 22b discharge said fluid through a feed line going to the shore. It is important to note that said double-acting piston is always under a tension force during the entire cycle and never under a compressing force, increasing the system's efficiency and protecting the piston from any structural stress and/or damages.

Figure 6:
FIG. 6 shows a top view of an implemented wave energy conversion system according to an embodiment of the invention.

The system could be implemented with a series/parallel arrangement of interconnected apparatus positioned along a coastal location as shown FIG. 6. In a preferred location with a significant concentration of wave energy, up to 75 percent of the deep-water value of 1,400 joules per $m^2$ or approximately 1,050 joules per $m^2$ is assumed. Taking an average wave period of 8 seconds, that is, a wave passing a given point every 8 seconds on average, gives then a value of 131 joules per second per $m^2$, or 131 Watts per $m^2$. The deep water wavelength associated with an 8 second wave is 100 meter. Thus, this gives 13,100 Watts per meter of wave crest, or 13 kilowatts per meter (which is approximately per meter of shoreline since, due to wave refraction, the wave crest tend to align themselves with shoreline). Assuming an energy absorbing panel measuring 4.6 meters (15 ft) facing the wave, then each unit (100% efficiency assumed) is bound to produce 13*4.6=59 kilowatts. Assuming a 1 ft separation between each unit, then in 1 mile, 328 units can be accommodated. Hence, obtaining 19 Megawatts per mile. If 15 rows of units (i.e., 1 mile long rows, with each row further seaward than the other —a group-), we get 285 Megawatts per group, where in a group that are 4,920 units.

Because many varying and differing embodiments maybe made within the scope of the inventive concept herein taught and because many modifications may be made in the embodiment herein detailed in accordance with the descriptive requirement of the law, it is to be understood that the details herein are to be interpreted as illustrative and not in a limiting sense.

The invention claimed is:

1. A hydroelectric wave-energy conversion device comprising:
    a buoyant apparatus having at least one buoyant component; a multi-directional to linear motion conversion apparatus connected to said buoyant apparatus, wherein said at least one buoyant component is configured to fold between a substantially perpendicular plane and a substantially parallel plane in relation to said multi-directional to linear motion conversion apparatus; and an anchoring apparatus connected to said conversion apparatus.

2. The hydroelectric wave-energy conversion apparatus of claim 1, wherein said at least one buoyant component folds in relation to said multi-directional to linear motion conversion apparatus when at least one of:
    at least one vectorial component of a sea wave impinges on said at least one buoyant component; and at least one of an unusual environmental condition and an unusual climate condition creates a sea wave with an above-average height.

3. The hydroelectric wave-energy conversion apparatus of claim 2, wherein said at least one buoyant component folds in a substantially parallel plane in relation to said multi-directional to linear motion conversion apparatus to allow sea submersion of said at least one buoyant component.

4. The hydroelectric wave-energy conversion device of claim 1, wherein said buoyant apparatus comprises: a light gage metal casing including a reinforcing means and a buoyant material filing.

5. The hydroelectric wave-energy conversion device of claim 1, wherein said multi-directional to linear motion conversion apparatus comprises: a first pipe and a second pipe coaxially located inside said first pipe.

6. The hydroelectric wave-energy conversion device of claim 5, wherein said multi-directional to linear motion conversion apparatus further comprises: a piston/cylinder arrangement coaxially located inside said second pipe.

7. The hydroelectric wave-energy conversion device of claim 6, wherein at least a part of said cylinder is fixedly attached in relation to said second pipe.

8. The hydroelectric wave-energy conversion device of claim 6, wherein said piston comprises a first end portion connected to a first tension means and a second end portion connected to a second tension means.

9. The hydroelectric wave-energy conversion device of claim 8, wherein said first tension means comprises a first pulley arrangement and said second tension means comprises a second pulley arrangement.

10. The hydroelectric wave-energy conversion device of claim 9, wherein said first tension means further comprises a first pulling means in mechanical relationship with said first pulley arrangement; and said second tension means further comprises a second pulling means in mechanical relationship with said second pulley arrangement.

11. The hydroelectric wave-energy conversion device of claim 10, wherein said first and second pulling means comprises at least one of: steel chain, steel cable or any combination thereof.

12. The hydroelectric wave-energy conversion device of claim 8, wherein said piston further comprises: a double acting piston which is upwardly and downwardly pulled by said first and second tension means, alternately.

13. The hydroelectric wave-energy conversion device of claim 12, wherein said piston/cylinder arrangement further comprises: at least one check valve allowing the inflow of at least one of: a fluid and a gas; and at least one check valve allowing the outflow of said at least one of: a fluid and a gas, while said double acting piston is upwardly and downwardly pulled.

14. The hydroelectric wave-energy conversion device of claim 13, wherein said at least one of: a fluid and a gas is received at a motor/generator arrangement located in at least one of: a land location remotely located form said wave-energy conversion device; and integrated into said wave-energy conversion device.

15. The hydroelectric wave-energy conversion device of claim 1, wherein said anchoring apparatus comprises: a rotating component in mechanical relationship with a holding means sufficiently buried under the sea floor; said rotating component allowing angular motion of said hydroelectric wave-energy conversion device in relation to the sea floor.

16. A hydroelectric wave-energy conversion system comprising: at least one of the hydroelectric wave-energy conversion device of claim 1.

17. The hydroelectric wave-energy conversion system of claim 16, wherein a plurality of hydroelectric wave-energy conversion devices is selectively interconnected in at least one of: a series arrangement, a parallel arrangement, or a combination thereof.

18. The hydroelectric wave-energy conversion system of claim 17, wherein kinetic energy converted by said conversion system is directed to a land-located pressurized stabilizing tank that stores said kinetic energy as potential energy.

19. The hydroelectric wave-energy conversion system of claim 18, wherein said stored potential energy is used to at least one of: compensate for any lack of converted energy and maintain a predetermined power capacity.

* * * * *